United States Patent [19]

Krawack

[11] Patent Number: 5,380,453
[45] Date of Patent: Jan. 10, 1995

[54] COMPOSITION COMPRISING ALKYL ESTERS OF ALIPHATIC ($C_8$–$C_{22}$) MONOCARBOXYLIC ACIDS AND OIL IN WATER EMULSIFIER

[75] Inventor: Borge Krawack, Hojbjerg, Denmark

[73] Assignee: Unichema Chemie B.V., Gouda, Netherlands

[21] Appl. No.: 183,959

[22] Filed: Jan. 21, 1994

Related U.S. Application Data

[63] Continuation of Ser. No. 873,382, Apr. 24, 1992, abandoned, which is a continuation-in-part of Ser. No. 671,807, Mar. 26, 1991, Pat. No. 5,143,639.

[30] Foreign Application Priority Data

Sep. 26, 1988 [DK] Denmark ............................. 5331/88
Sep. 25, 1989 [WO] WIPO ................. PCT/DK89/00222

[51] Int. Cl.⁶ .......................... C11D 7/22; C11D 1/18; C23D 17/00
[52] U.S. Cl. .................................. 252/162; 252/170; 252/171; 252/172; 252/364; 252/173; 252/DIG. 8
[58] Field of Search ............... 252/162, 170, 171, 172, 252/364, DIG. 8, 173; 134/38, 39, 40

[56] References Cited

U.S. PATENT DOCUMENTS

| | | | |
|---|---|---|---|
| 4,176,080 | 11/1979 | Wise et al. | 252/162 |
| 4,180,472 | 12/1979 | Mitchell et al. | 252/162 |
| 4,284,532 | 8/1981 | Leikhim et al. | 252/173 X |
| 4,521,326 | 6/1985 | Seibert et al. | 252/170 X |
| 4,707,293 | 11/1987 | Ferro | 252/162 X |
| 5,104,567 | 4/1992 | Staehr | 252/162 X |

FOREIGN PATENT DOCUMENTS 1240469  7/1971  United Kingdom.

OTHER PUBLICATIONS

A World Patent Index Abstract of Japanese Patent 81 035 716-B, Aug. 1981.

*Primary Examiner*—Paul Lieberman
*Assistant Examiner*—Douglas J. McGinty
*Attorney, Agent, or Firm*—Michael L. Dunn

[57] ABSTRACT

A composition for removing ink from a printing machine, which composition comprises 50–99.75% by weight of a $C_1$–$C_5$ alkyl ester of an aliphatic $C_8$–$C_{22}$ monocarboxylic acid and mixtures thereof; and 0.25–10% by weight oil in water emulsifier. The composition preferably comprises less than 19 weight percent of combined alkanes, alkenes and $C_1$–$C_{10}$ alkyl esters of fatty acids having 18 carbon atoms or less. The composition may contain vegetable oil in an amount of up to 15% by weight.

The invention further comprises an emulsion for removing ink from a printing machine which comprises the forgoing composition emulsified in water in such amount that the water phase comprises up to 50% by weight of the emulsion, and combined emulsifier in an amount of 0.5–10% by weight of emulsion, at least 50% of said combined emulsifier being an oil in water emulsifier.

22 Claims, No Drawings

COMPOSITION COMPRISING ALKYL ESTERS OF ALIPHATIC ($C_8$–$C_{22}$) MONOCARBOXYLIC ACIDS AND OIL IN WATER EMULSIFIER

This is a continuation of co-pending application Ser. No. 07/873,382, filed Apr. 24, 1992, now abandoned, which in turn is a continuation-in-part of co-pending PCT application PCT/DK89/00222, filed Sep. 25, 1989, filed in the United States as U.S. patent application Ser. No. 07/671,807, filed Mar. 26, 1991, now U.S. Pat. No. 5,143,639.

BACKGROUND OF THE INVENTION

The invention concerns a special use of ($C_1$–$C_5$) alkyl esters of aliphatic ($C_8$–$C_{22}$) monocarboxylic acids for removing fat, inks and the like from printing machines, in particular from offset printing machines. The invention also concerns an agent and a method for removing fat, inks and the like from printing machines, in particular from offset printing machines.

In the past, white spirit, optionally in mixture with chlorinated hydrocarbons and/or with surfactants and optionally additionally dispersed in water, was generally used for cleaning printing machines of fat, inks and the like.

The cleaning was effected by spraying the cleaning agent onto the uppermost inking roller. With the machine running, the cleaning agent was dispersed downwards over the other rollers and was removed by means of a washing doctor clamped to the bottom roller. After a couple of sprayings with the cleaning agent, the rollers were clean. The cleaning operation was ended by spraying the rollers with water, and then the machine was ready for printing again. In special cases, it was necessary to wipe the rollers with a clean cloth. Now and then it was also necessary to wipe the printing plate and the rubber blanket with a cloth moistened with the cleaning agent.

Owing to the harmful effects on the environment of using white spirit, kerosene or other mineral oil products it has been attempted to use other substances having corresponding properties e.g., in the graphic industry, it has been attempted to use liquid fatty oils, e.g. soy bean oil, for cleaning offset printing machines of ink. Such cleaning is effected in the same way as described above. However, strong cloth rubbing on the rollers is also necessary for the oil to be able to dissolve all the ink, and the process must often be repeated several times to obtain clean rollers. This is caused partly by the high viscosity of the oil and partly by the low dissolution rate.

Methylesters of fatty acids have been used for aqueous cleaning of fabrics. U.S. Pat. No. 4,180,472 discloses compositions and methods for removing oily soils from fabrics in an aqueous washing process. The compositions consist of 20–97% alkanes or fatty acid esters and 3–30% water-in-oil emulsifiers. The concentration of the alkanes or fatty acid esters is from about 0.1 to about 3% in the aqueous washing medium. Fatty acid esters having an alkyl group no longer than 17 carbon atoms in conjunction with alkanes must comprise at least 20% of the composition. Such patent does not suggest cleaning and removal of printing inks from printing rollers.

British Patent No. 1,240,769 discloses an aqueous composition suitable for cleaning metal, glass and painted surfaces. The composition contains inorganic or organic acids, for instance 50% concentrated phosphoric acid, cationic emulsifiers and small amounts of oily substances, for instance fatty acid esters, which are added to increase the viscosity of the composition and increase the adhesive properties. The composition may be diluted with water before application in a ratio of from 1:2 to 1:10 by volume.

Japanese Patent No. 81 035 716-B discloses a non-aqueous composition and method for removing scales of soap on the inside wall of heat exchangers. The composition consists of a mixture of fatty acids and their methyl esters, and the cleaning is performed at 100°–130° C.

BRIEF DESCRIPTION OF THE INVENTION

It has surprisingly been found that all the above-mentioned drawbacks in the cleaning of printing machines, in particular offset printing machines are obviated by using, a composition according to the invention which comprises a ($C_1$–$C_5$) alkyl ester of an aliphatic ($C_8$–$C_{22}$) monocarboxylic acid or a mixture of such esters, usually in conjunction with an oil in water surfactant (emulsifier). With such agent the cleaning can be performed in the same way as described above using cleaning agents based on organic solvents.

In certain cases, cleaning of offset printing machines may cause a weak film to be formed on the "Rilsan" ® rollers so that some ink is transferred to the wetting device and ink the filt rollers. This may be counteracted by dissolving a small amount, up to 10% by weight, of one or more surfactants in the ester or ester mixture. Oil in water surfactants (emulsifiers) are preferred which may have an HLB of from 5 to 18, and usually an HLB greater than 8.

Thus, it is preferred according to the invention to use an ester or ester mixture containing up to 10%, and as little as 0.25%, preferably 0.5–2%, by weight of surfactant.

It is also possible according to the invention to use a mixture of the ester or ester mixture with up to 50%, preferably up to 15%, by weight of vegetable oil, said mixture optionally containing up to 10% by weight of surfactant.

The above agents may further, according to the invention, be emulsified in water in such amount that the water phase comprises up to 50%, preferably 25–35% by weight of the emulsion, using an emulsifier in an amount of 0.5–10%, preferably 3–5% by weight of the emulsion. Preferably at least 50% of the emulsifier, including emulsifier already in the alkyl ester, (combined emulsifier) is oil in water emulsifier. It is convenient to further add a corrosion inhibitor in an amount of up to 2%, preferably 0.5–1% by weight of the emulsion.

DETAILED DESCRIPTION OF THE INVENTION

Oil-in-water emulsions of the ($C_1$–$C_5$) alkyl esters of aliphatic ($C_8$–$C_{22}$) monocarboxylic acids generally have a much higher viscosity than the neat esters. However, the emulsions are readily dispersed on the printing machines, and they are removed without difficulty by rinsing with water after the cleaning operation.

Thus, in a general sense, use according to the invention may be made of a mixture comprising 50–100% by weight of a ($C_1$–$C_5$) alkyl ester of an aliphatic ($C_8$–$C_{22}$) monocarboxylic acid or mixture of such esters, 0–50% by weight of vegetable oil and 0–10%, preferably 0.5–2% by weight of surfactant, said mixture being optionally emulgated in water in such amount that the water phase comprises up to 50%, preferably 25–35% by weight of the emulsion, using an emulsifier in an amount of 1–10%, preferably 3–5% by weight of the emulsion and optionally adding a corrosion inhibitor in an amount of up to 2%, preferably 0.5–1% by weight of the emulsion. The alkyl esters of fatty acids are preferably esters of long chain fatty acids, i.e., $C_{19}$–$C_{22}$ which provides a desirable balance of hydrophilic and hydrophobic properties. Therefore, usually less than 19 weight percent of the composition comprises alkanes, alkenes and $C_1$–$C_{10}$ alkyl esters of fatty acids having 18 carbon atoms or less.

Particularly suited for use according to the invention are esters which are liquid at room temperature.

The most suitable esters for use according to the invention are methyl, ethyl or isopropyl esters or mixtures thereof, and particularly useful is the methyl ester.

According to the invention, the fatty acid esters may be saturated, but particularly useful are ester mixtures comprising esters of unsaturated fatty acids, such as oleic, linoleic, linolenic and erucic acid. Preferably, at least 81% by weight of the esters comprise alkyl esters of unsaturated acids.

Esters containing unsaturated fatty acids have a particularly low melting point, but to obtain improved stability against oxidation partially hydrogenated esters may be used, the content of polyunsaturated fatty acids having been reduced by partial hydrogenation of tile esters or of the fatty acids or fats used in the production of the esters. Alternatively, antioxidants may be added.

Also, esters of ricinoleic acid may be used according to the invention.

The present esters can be produced in a known manner by esterification of a suitable ($C_8$–$C_{22}$) monocarboxylic acid or a mixture of such acids with a ($C_1$–$C_5$) alcohol. They can also be produced in a known manner by interesterification of a suitable fat (triglyceride) with a ($C_1$–$C_5$) alcohol, optionally after preceding fractionation of the fat or by fractionation of the ester mixture to provide mixtures having particularly desirable properties.

It is particularly expedient, both with respect to composition and price, to use an ester mixture obtained by interesterification of an oleic acid containing oil or by esterification of a fatty acid mixture having a corresponding composition. The oleic acid containing oil may advantageously be selected from soy bean oil, rapeseed oil, olive oil, sunflower oil, cottonseed oil, palm oil, palm kernel oil, and coconut oil.

When liquid, these esters are low viscosity substances which, after cleaning of the printing machines, can easily be removed again without leaving an oil film. They are likewise excellent and quickly acting solvents for inks, etc.

The esters are biologically degradable, and they are not toxic. Thus, the methyl esters have an $LD_{50}$ greater than 10 g/kg body weight for rats. They have such a low vapour pressure at room temperature that the vapours do not have any discomforting effect when inhaled.

The esters moreover have such a high flash point that they can be transported, stored and used without fire danger problems.

The vegetable oils which can be used in admixture with the ($C_1$–$C_5$) alkyl esters of aliphatic ($C_8$–$C_{22}$) monocarboxylic acids include soy bean oil, rapeseed oil, sunflower oil, cottonseed oil and low-melting fractions of palm oil, palm kernel oil and coconut oil and mixtures thereof. Coconut oil, palm kernel oil and palm oil may be used in amounts of 0–25% by weight. A content of 5–15% by weight of these oils or mixtures thereof is especially convenient, as higher contents increase the viscosity of the agent making it more difficult to remove from the printing machines after the cleaning operation. Preferred oils for esterification comprise unsaturated oils such as soybean oil, olive oil, sunflower oil, cottonseed oil, and rapeseed oil. The most preferred oils are at least 80% unsaturated.

A suitable class of surfactants for use according to the invention is of the type of polyglycol ethers of aliphatic ($C_8$–$C_{22}$) alcohols.

A suitable class of emulsifiers for preparing aqueous emulsions for use according to the invention is of the type of saturated ($C_{12}$–$C_{22}$) fatty alcohols ethoxylated with 7–14, in particular 9–12, ethoxy groups.

As examples of corrosion inhibitors to be added to the aqueous emulsions may be mentioned aliphatic primary amines having 12–18 carbon atoms.

The invention further concerns an agent, as previously described, for removing fat, inks and the like from printing machines, in particular, from offset printing machines, which is characterized in that as a main component it comprises a ($C_1$–$C_5$) alkyl ester of an aliphatic ($C_8$–$C_{22}$) monocarboxylic acid or a mixture of such esters.

More specifically, the agent according to the invention consists of a mixture comprising 50–100% by weight of a ($C_1$–$C_5$) alkyl ester of an aliphatic ($C_8$–$C_{22}$) monocarboxylic acid or mixture of such esters, 0–50% by weight of vegetable oil and 0–10%, preferably 0.5–2% by weight of surfactant, said mixture being optionally emulgated in water in such amount that the water phase comprises up to 50%, preferably 25–35% by weight of the emulsion, using an emulsifier in an amount of 1–10%, preferably 3–5% by weight of the emulsion and optionally adding a corrosion inhibitor in an amount of up to 2%, preferably 0.5–1% by weight of the emulsion.

As mentioned above, the most suitable esters to form all or part of the agent according to the invention are methyl, ethyl or isopropyl esters or mixtures thereof, and particularly expedient are the above-mentioned ester mixtures obtained from oleic acid containing fats and being liquid at ambient temperature.

The vegetable oils, surfactants, emulsifiers and corrosion inhibitors to be included in the agent according to the invention are preferably of the types discussed above.

The agent according to the invention may advantageously contain 0.05–10% by weight of one or more surfactants. If a surfactant is added to the cleaning agent, it will most generally contain 0.4–2% by weight, and preferably 1–1.5% by weight of surfactant.

The agent according to the invention may, moreover, contain various stabilizers, e.g., preservatives and antioxidants, which might be deemed necessary or desirable.

As an example, it may be mentioned that methyl esters of fatty acids from rapeseed oil have the following physical data:

| | |
|---|---|
| Vapour pressure | 0.027 Pa at 40° C. |
| Viscosity | 0.007 Pa · s at 25° C. |
| Flash point | >150° C. |

| | |
|---|---|
| Cold haze point | < −15° C. |
| Toxicity, LD$_{50}$ | >20 g/kg body weight (rats) |

With this ester mixture, excellent results in the cleaning of an offset printing machine of ink have been obtained. The ink could easily be washed off without leaving any film on the rollers and without any discomfort to the operator at all.

In certain cases there is a tendency to film formation on the "Rilsan" ® roller. This can be avoided completely by addition of 1-1.5% by weight of the surfactant "Dehydol ® LT7" (heptaethylene glycol monolauryl ether). However, usually this is not essential to obtain a good function of the product.

The amount of agent to be used in each cleaning operation varies considerably, according to which ink colour shift it is desired to make, and how much ink remains on the rollers. An offset printing machine comprises 3-5, in special cases 7, inking apparatuses, one per colour used. When using the agent according to the invention ordinarily 150-250 ml is sprayed on the uppermost roller of the inking apparatus, and often one spraying is sufficient.

When using a solvent-based cleaning agent normally 300-500 ml is sprayed on the uppermost roller of the inking apparatus, and if necessary, the spraying is repeated.

EXAMPLE

Rapeseed oil methyl ester was used for six months for cleaning a plurality of offset printing machines of the teidelberg make installed at a technical school.

The inking rollers were cleaned by spraying with the rapeseed oil methyl ester, and then the ester with dissolved ink residues was removed by means of a washing doctor. Any greasy film on the rollers was removed by pouring water on the rollers and removing the water with the washing doctor.

When rubber blanket cylinder and printing plate were washed, small ester residues were left now and then, causing tinting tendencies. The residues were easily removed by wiping with a cloth, application of water with a sponge and finally drying with a dry cloth.

The cleaning process is analogous to the previously used cleaning process using agents containing solvents. The amount of solvent-containing cleaning agent to be used was approximately twice as large, and in spite of exhaust at each machine unpleasant concentrations of solvent vapours were present in the printing room.

The labour involved by cleaning with rapeseed oil methyl ester was significantly reduced. Thus, after printing with black ink, cleaning once with the ester was sufficient, while the solvent-based cleaning agents usually necessitates cleaning two or three times.

COMPARATIVE EXAMPLE

Tests with cleaning of offset printing machines by means of soy bean oil have been performed. Here too, the atmosphere in the printing room was improved, but the colour residues were dissolved so slowly that it was necessary to rub the rollers with cloths, and the cleaning often had to be repeated before the rollers were clean. Even then, an oil film remains on the rollers and has to be removed by other means.

What is claimed is:

1. A composition for removing ink from a printing machine, which comprises an emulsion of a composition comprising 50-99.5% by weight of a $C_1$-$C_5$ alkyl ester of an aliphatic $C_8$-$C_{22}$ monocarboxylic acid and mixtures of such esters in at least 25% up to 50% water, and 0.25-10% by weight oil in water emulsifier, wherein the emulsion consists essentially of an oil in water emulsion, said alkyl ester being sufficiently liquid and containing sufficient emulsifier to be removable from printing machines without leaving an oil film.

2. A composition for removing ink from a printing machine, which composition comprises 50-99.75% by weight of a liquid $C_1$-$C_5$ alkyl ester of an aliphatic unsaturated $C_8$-$C_{22}$ monocarboxylic acid and mixtures of such esters; and 0.25-10% by weight oil in water emulsifier, said alkyl ester being sufficiently liquid and containing sufficient emulsifier to be removable from printing machines without leaving an oil film.

3. The composition of claim 2 wherein less than 19 weight percent of the composition comprises alkanes, alkenes and $C_1$-$C_{10}$ alkyl esters of fatty acids having 18 carbon atoms or less.

4. The composition of claim 2 wherein the composition contains vegetable oil in an amount of up to 15% by weight.

5. An emulsion for removing ink from a printing machine which consists of an oil in water emulsion comprising the composition of claim 2 emulsified in water in such amount that a water phase of the emulsion comprises up to 50% by weight of the emulsion, and emulsifier is present in an amount of 0.5-10% by weight of said emulsion.

6. The composition of claim 3 wherein at least 81% by weight of alkyl ester comprises alkyl ester of unsaturated acid.

7. The composition of claim 2 wherein the alkyl ester is a mixture of alkyl esters.

8. The emulsion of claim 5 wherein the emulsion contains a corrosion inhibitor in an amount of up to 2% by weight of the emulsion.

9. The emulsion of claim 5 wherein the water phase comprises 25-35% by weight of emulsion.

10. The emulsion of claim 9 wherein the emulsifier comprises 3-5% by weight of the emulsion.

11. A composition according to claim 7 wherein the ester mixture has been obtained by esterification of an oleic acid containing oil.

12. An emulsion according to claim 5 wherein the alkyl ester is a mixture of alkyl esters obtained by esterification of an oleic acid containing oil.

13. A composition according to claim 11 wherein the oleic acid containing oil is selected from the group consisting of soy bean oil, rapeseed oil, olive oil, sunflower oil, cottonseed oil, and mixtures thereof.

14. A composition according to claim 11 wherein the oil comprises a synthetic mixture of fatty acids including oleic acid.

15. A composition according to claim 2 wherein the esters are selected from the group consisting of methyl, ethyl, isopropyl esters and mixtures thereof.

16. An emulsion according to claim 12 wherein the esters are selected from the group consisting of methyl, ethyl and isopropyl esters and mixtures thereof.

17. A composition according to claim 4 wherein the composition contains a vegetable oil which is a low-melting fraction of palm oil, palm kernel oil, coconut oil or mixtures thereof.

18. A composition according to claim 4 wherein the vegetable oil is palm oil, palm kernel oil, coconut oil or a mixture thereof in an amount of 5-15% by weight of the agent.

19. A composition according to claim 5 wherein the emulsifier comprises a polyglycol ether of an aliphatic ($C_8$-$C_{22}$) alcohol.

20. A composition according to claim 2 wherein the emulsifier comprises a saturated ($C_{12}$-$C_{22}$) fatty alcohol ethoxylated with 7-14 ethoxy groups.

21. An emulsion according to claim 8 wherein the corrosion inhibitor comprises an aliphatic primary amine having 12-18 carbon atoms.

22. The composition of claim 2 wherein the oil in water emulsifier has an HLB value of from 5 to 18.

* * * * *